United States Patent
Yoon (10) Patent No.: US 7,848,407 B2
(45) Date of Patent: Dec. 7, 2010

(54) METHODS, CIRCUITS, AND COMPUTER PROGRAM PRODUCTS FOR SYNTAX PARSING IN H.264 COMPLIANT VIDEO DECODERS

(75) Inventor: Suk-hyun Yoon, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1596 days.

(21) Appl. No.: 11/137,740

(22) Filed: May 25, 2005

(65) Prior Publication Data

US 2005/0265449 A1    Dec. 1, 2005

(30) Foreign Application Priority Data

May 29, 2004   (KR) .................. 10-2004-0038712

(51) Int. Cl.
    *H04B 1/66* (2006.01)
(52) U.S. Cl. .............. 375/240.01; 375/240.26; 375/240.25; 375/240.28; 382/235; 382/233
(58) Field of Classification Search .......... 375/240.01, 375/240.25, 240.26, 240.28; 382/233, 235
    See application file for complete search history.

(56) References Cited

U.S. PATENT DOCUMENTS

| 7,415,069 | B2 * | 8/2008 | Winger ............. | 375/240.25 |
| 2004/0017852 | A1 | 1/2004 | Garrido et al. ......... | 375/240.16 |
| 2004/0017853 | A1 | 1/2004 | Garrido et al. ......... | 375/240.16 |
| 2004/0022318 | A1 | 2/2004 | Garrido et al. ......... | 375/240.11 |
| 2004/0028141 | A1 | 2/2004 | Hsiun et al. .......... | 375/240.25 |
| 2004/0066852 | A1 | 4/2004 | MacInnis ............. | 375/240.25 |
| 2004/0223551 | A1 | 11/2004 | Hannuksela .......... | 375/240.25 |
| 2005/0025246 | A1 | 2/2005 | Holcomb ............. | 375/240.23 |
| 2005/0175098 | A1* | 8/2005 | Narasimhan et al. ... | 375/240.12 |

FOREIGN PATENT DOCUMENTS

EP    1 351 516 A2    10/2003

OTHER PUBLICATIONS

Budagavi et al., "Wireless MPEG-4 Video Communication on DSP Chips", IEEE Signal Processing Magazine, pp. 36-53 (Jan. 2000).
Richardson, "H.264 and MPEG-4 Video Compression: Video Coding for Next-generation Multimedia", John Wiley & Sons, England, pp. 159-223 (Dec. 31, 2003).
Victor ha, et al. "Portable Receivers for Digital Multimedia Broadcasting" *IEEE Transactions on Consumer Electronics* vol. 50, No. 2, pp. 666-673 (May 2, 2004).
Hae-Young Kang et al. "MPEG4 AVC/H.264 Decoder with Scalable Bus Architecture and Dual Memory controller" *Proceedings of the 2004 International Symposium on Circuits and Systems* vol. 2, pp. 145-148 (May 23, 2004).

(Continued)

*Primary Examiner*—Shawn An
(74) *Attorney, Agent, or Firm*—Myers Bigel Sibley & Sajovec, P.A.

(57) ABSTRACT

A method of processing H.264 compliant can include allocating a plurality of regions in a memory internal to an H.264 compliant syntax parser circuit for concurrent storage of a plurality of slice headers associated with respective H.264 slice data to be processed. Related circuits and computer program products are also disclosed.

11 Claims, 5 Drawing Sheets

OTHER PUBLICATIONS

Madhukar Budagavi, et al. "Wireless MPEG-4 Video Communication on DSP Chips" *IEEE Signal Processing Magazine* vol. 17, No. 1 pp. 36-53 (Jan. 1, 2000).

Weisi Lin "On Fast Firmware/Software-Based Video Coding" *IEEE Transactions on Consumer Electronics* vol. 48, No. 2, pp. 209-219 (May 1, 2002).

To-Wei Chen, et al. "Architecture Design of H.264/AVC Decoder with Hybrid Task Pipelining for High Definition Videos" *IEEE International Symposium on circuits and Systems* pp. 2931-2934 (May 23, 2005).

Yadav et al. "MAVD: MPEG-2 Audio Video Decode System on MDSP" *IEEE International Symposium on Consumer Electronics* pp. 19-24 (Sep. 1, 2004).

European Search Report for Application No. EP 06 02 3199, mailed Jan. 23, 2007.

Thung-Chien et al. "Analysis and Design of Macroblock Pipelining for H. 264/AVC VLSI Architecture" *Proceedings of the International Symposium on Circuits and Systems* vol. 2, pp. 273-276 (May 23, 2004).

Tamhankar et al. "An Overview of H.264/MPEG-4 Part 10" *4th EURASIP Conference Focused on Video/Image Processing and Multimedia Communications* pp. 1-51 (Jul. 2, 2003).

Ostermann et al.; Title: *Video Coding with H.264/AVC: Tools, Performance, and Complexity*; IEEE Circuits and Systems Magazine; First Quarter 2004; pp. 7-28.

Wiegand, et al.; Title: *Overview of the H.264 / AVC Video Coding Standard*; IEEE Transactions on Circuits and Systems for Video Technology, Jul. 2003, pp. 1-19.

European Search Report for European patent application No. 05 25 3267 completed on Oct. 4, 2005.

Ha et al. "Portable Receivers for Digital Multimedia Broadcasting" *IEEE Transactions on Consumer Electronics* 50(2): 666-673 (2004).

Kang et al. "MPEG4 AVC/H.264 Decoder with Scalable Bus Architecture and Dual Memory Controller" *ISCAS 2004 Proceedings of the International Symposium on Circuits and Systems* vol. 2 pp. 145-148 (2004).

Budagavi et al. "Combining Efficiency and Error Robustness: Wireless MPEG-4 Video Communication on DSP Chips" *IEEE Signal Processing Magazine* 17(1): 36-53 (2000).

Lin et al. "On Fast Firmware/Software-Based Video Coding" *IEEE Transactions on Consumer Electronics* 48(2): 209-219 (2002).

Chen et al. "Architecture Design of H.264/AVC Decoder with Hybrid Task Pipelining for High Definition Videos" *IEE International al Symposium on Circuits and Systems* pp. 2931-2934 (May 2005).

Yadav et al. "MAVD: MPEG-2 Audio Video Decode System on MDSP™" *IEEE International Symposium on Consumer Electronics* pp. 19-24 (Sep. 2004).

Tung-Chien et al. "Analysis and Design of Macroblock Pipelining for H.264/AVC VLSI Architecture" *ISCAS Proceedings for the International Symposium on Circuits and Systems* vol. 2 pp. 273-276 (May 2004).

Tambankar et al. "An Overview of H.264/MPEG-4 part 10" *4th EURASIP Conference Focused on Video/Image Processing and Multimedia Communications* pp. 1-51 (Jul. 2003).

* cited by examiner

METHODS, CIRCUITS, AND COMPUTER PROGRAM PRODUCTS FOR SYNTAX PARSING IN H.264 COMPLIANT VIDEO DECODERS

CROSS-REFERENCE TO RELATED APPLICATION

This application claims priority under 35 U.S.C. §119 to Korean Patent Application 2004-38712, filed on May 29, 2004, the entire content of which is incorporated herein by reference.

FIELD OF THE INVENTION

The invention relates to decoding, and more particularly, to decoding of data for H.264 compliant systems.

BACKGROUND

H.264/AVC (Advanced Video Coding), which is also referred to as MPEG-4/AVC, is a recommendation by the International Telecommunication Union (ITU-T) related to the encoding/decoding of video data. H.264/AVC can be used in a wide range of video applications, such as video conferencing, video broadcasting, and/or video streaming services with better compression than H.262 (i.e., MPEG-2) and H.263 (i.e., MPEG-4).

One of the reasons that H.264 can be used for a wide range of applications is that the transport of video data is treated differently from the decoding of the data. In particular, H.264/AVC specifies a Video Coding Layer (VCL) and a Network Abstraction Layer (NAL). The VCL specifies how video is coded/decoded/displayed, whereas the NAL specifies how that data is transmitted, for example, over a network. In this way, applications can be written differently depending on the environment in which the application will ultimately operate.

Data handled at the NAL level can be classified into VCL and non-VCL NAL units. In particular, VCL NAL units contain video data that corresponds to the samples in the video, whereas the non-VCL NAL units contain data that can describe how the data included in the VCL NAL units is to be decoded and/or displayed.

According to H.264/AVC, the VCL NAL units are used to transmit a series of images, which each include macroblocks of coded video data. The macroblocks of data are organized into slices within each of the images. Therefore, each image in the series includes a number of slices which include the macroblocks of video data that, when decoded, correspond to pixels within the slice. Each slice is prefaced by a "slice header" that includes information associated with the video data in that slice.

The NAL units (VCL and non-VCL) can be read as a bit stream from a buffer and parsed (in the NAL) by a syntax parser to determine, for example, which units (such as VCL NAL units) are to be processed for display. Parsed VCL NAL units can be processed by the VCL using an entropy decoder, an inverse transformer, a predictor, and a de-blocking filter.

The syntax parser can also process non-VCL NAL units that include information associated with how the video data in the VCL NAL units is to be processed. For example, the syntax parser can also parse non-VCL NAL units that include environmental information indicating how frames of video are to be processed and/or displayed or how a sequence of frames is to be processed and/or displayed. For example, some of the non-VCL NAL units can include Sequence Parameter Sets (SPS) and Picture Parameter Sets (PPS). The PPS can include a PPS ID (that identifies the PPS), an SPS ID that identifies which series of frames that is associated with the PPS, a flag for selecting either context adaptive variable length coding (CAVLC) or context-based adaptive binary arithmetic coding (CABAC) entropy coding, parameters that define slice groups, and parameters for prediction, quantization, and de-blocking. The SPS includes parameters that can indicate how a series of frames of video is to be processed and/or displayed. For example, the SPS includes the SPS ID that identifies the SPS (which is used in the PPS as a reference to the SPS), an indication of the maximum number of frames in the series, an indication of the order of frames in the series, and the width and height of a decoded frame in the series.

In operation, the "slice headers" included with the VCL NAL units are parsed to determine which parameters (i.e., which PPS and SPS) are to be applied to the decoding and/or display of the video data included as the payload in the VCL NAL unit. Furthermore, the environmental information including slice headers and video data, are compressed using an Exp-Golomb code and, therefore, may need to be decoded prior to access.

SUMMARY

Embodiments according to the invention can provide methods, circuits, and computer program products for syntax parsing in H.264 compliant video decoders. Pursuant to these embodiments, a method of processing H.264 compliant can include allocating a plurality of regions in a memory internal to an H.264 compliant syntax parser circuit for concurrent storage of a plurality of slice headers associated with respective H.264 slice data to be processed.

In some embodiments according to the invention, the method can further include transferring a plurality of parameter sets associated with the plurality of slice headers from an external memory to the internal memory. In some embodiments according to the invention, transferring includes transferring a plurality of first parameter sets to a first allocated region of the internal memory responsive to parsing a first slice header that references the first parameter set. A plurality of second parameter sets can be transferred to a second allocated region of the internal memory responsive to parsing a second slice header that references the second parameter set. In some embodiments according to the invention, the plurality of first parameter sets includes a first H.264 compliant Picture Parameter Set (PPS) and a first H.264 compliant Sequence Parameter Set (SPS) and the plurality of second parameter sets include a second H.264 compliant PPS and a second H.264 compliant SPS.

In some embodiments according to the invention, the method can further include applying the first PPS and the first SPS to a first stage of a video processing pipeline to provide processing of a first slice associated with a first one of the plurality of slice headers. In some embodiments according to the invention, the first stage provides an output based on the processing of the first slice and the method further includes applying the second PPS and the second SPS to the first stage to provide processing of a second slice associated with a second one of the plurality of slice headers. The first PPS and the first SPS can be concurrently applied to a second stage of the video processing pipeline to provide processing of the output from the first stage.

In some embodiments according to the invention, the method further includes transferring the first PPS and the first SPS to the second region of the internal memory prior to concurrently applying the first PPS and the first SPS to the second stage. In some embodiments according to the invention, the method further includes changing a pointer associated with the second stage of the video processing pipeline to the first region prior to concurrently applying the first PPS and the first SPS to the second stage.

In some embodiments according to the invention, an H.264 compliant processing circuit can include a syntax parser circuit configured to parse an H.264 compliant bit stream to detect H.264 slice headers and non-Video Coding Layer (VCL) Network Abstraction Layer (NAL) units and a memory, coupled to the syntax parser circuit, configured for allocation of a plurality of regions therein for concurrent storage of the H.264 slice headers.

In some embodiments according to the invention, the memory can be an internal memory included in an integrated circuit package with the syntax parser circuit. In some embodiments according to the invention, In some embodiments according to the invention, the circuit further includes a control circuit, coupled to the syntax parser circuit and the memory, configured to transfer a plurality of first parameter sets to a first one of the allocated plurality of regions responsive to receiving a parsed first slice header that references the first parameter set and configured to transfer a plurality of second parameter sets to a second one of the allocated plurality of regions of the internal memory responsive to parsing a second slice header that references the second parameter set.

In some embodiments according to the invention, a computer program product for processing H.264 compliant data includes computer readable program code configured to allocate a plurality of regions in a memory internal to an H.264 compliant syntax parser circuit for concurrent storage of a plurality of slice headers associated with respective H.264 slice data to be processed.

DESCRIPTION OF EMBODIMENTS ACCORDING TO THE INVENTION

The invention is further described hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

As will be appreciated by one of skill in the art, the invention may be embodied as circuits, methods, and/or computer program products. Accordingly, the invention may take the form of an entirely hardware embodiment, an entirely software embodiment or an embodiment combining software and hardware aspects. Furthermore, the invention may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or non-transitory computer-readable medium may be, for example but not limited to, an electronic, magnetic, optical, electromagnetic, infrared, or semiconductor system, apparatus, or device. More specific examples (a non-exhaustive list) of the non-transitory computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

It should also be noted that in some alternate implementations, the functions/acts noted in the blocks may occur out of the order noted in the diagrams. For example, two blocks shown in succession may in fact be executed substantially concurrently or the blocks may sometimes be executed in the reverse order, depending upon the functionality/acts involved.

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present invention is not TCP/IP-specific or Internet-specific. The present invention may be embodied using various protocols over various types of computer networks.

The invention is described with reference to diagram illustrations of methods, systems and computer program products according to embodiments of the invention. It is understood that each block of the illustrations, and combinations of blocks in the illustrations can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Embodiments according to the invention can operate in a logically separated client side/server side-computing environment, sometimes referred to hereinafter as a client/server environment. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server under the control of a user. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. A SOAP client can be used to request web services programmatically by a program in lieu of a web browser.

The applications provided by the service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

Figure 1:
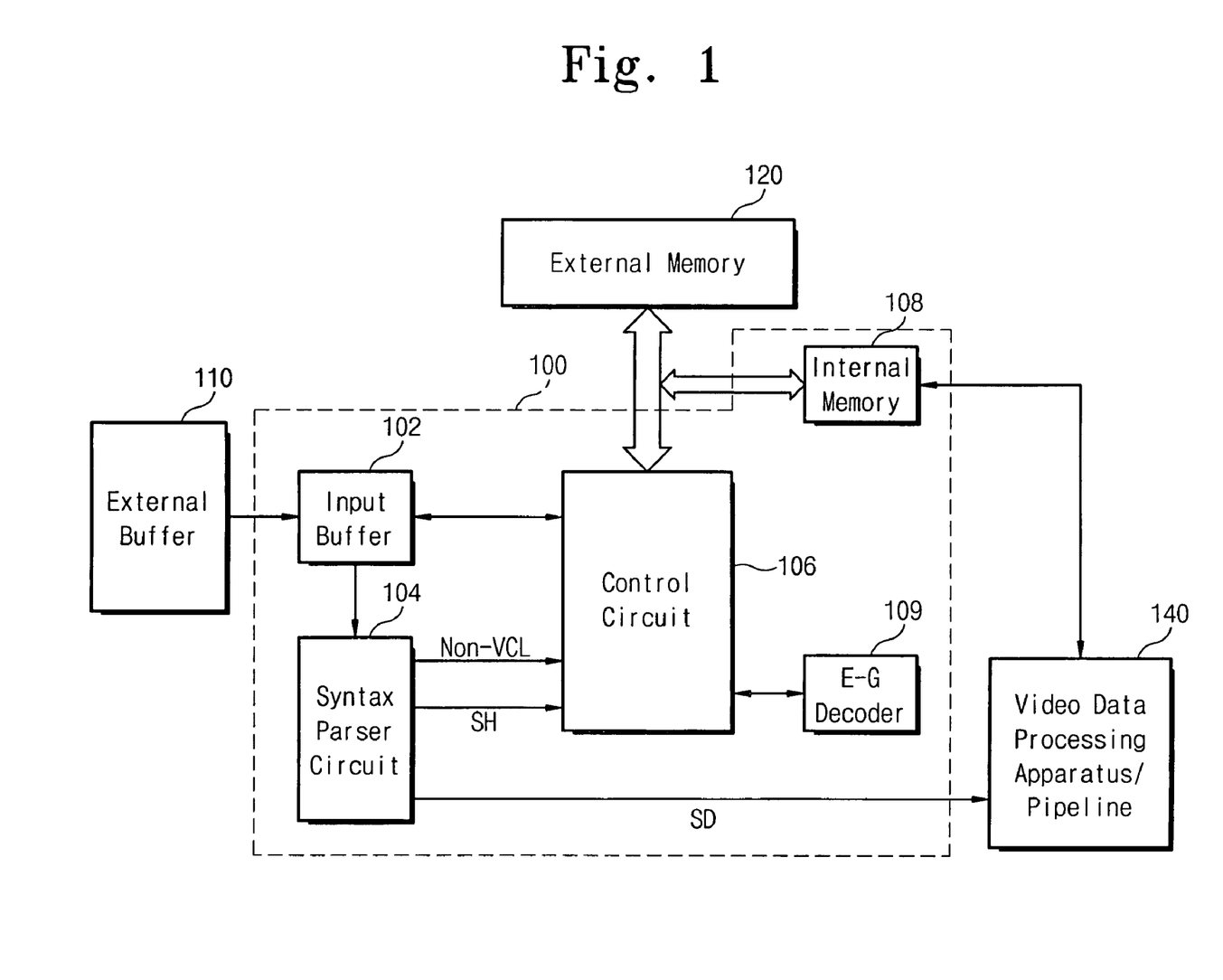
FIG. 1 is a block diagram that illustrates H.264 compliant decoding circuits including a syntax parser circuit according to some embodiments of the invention.

FIG. 1 is a block diagram that illustrates an H.264 compliant processing circuit 100 including a syntax parser circuit 104 according to some embodiments of the invention. As illustrated in FIG. 1, the H.264 compliant processing circuit 100 includes an input buffer 102, a syntax parser circuit 104, a control circuit 106, an internal memory 108, and an Exp-Golomb decoder 109. The H.264 compliant processing circuit 100 is coupled to an external memory 120, a video data processing apparatus or "pipeline" 140, and an external buffer 110.

In some embodiments according to the invention, the internal memory 108 is a static random access memory (SRAM) that is internal to the same integrated circuit package that houses the syntax parser circuit 104. In some embodiments according to the invention, the input buffer 102 is a 32 bit double buffer controlled by the control circuit 106 to store data from a bit stream read from an external buffer 110. In some embodiments according to the invention, the external buffer 110 is an H.264 compliant coded picture buffer (CPB) for storing coded picture information that can be accessed as a bit stream. It will be understood that "external" refers to circuitry that is not in the same integrated circuit package that houses the syntax parser circuit 104.

In operation, the syntax parser circuit 104 reads a bit stream of data from the input buffer 102 and parses the data for a start code (SC) that indicates the start of a respective slice header and respective data in the bit stream. In particular, the start code is followed by a slice header that includes, for example, information indicating how subsequent slice data is to be processed. In some embodiments according to the invention, the indication as to how the data is to be processed can be provided by a direct or indirect reference to parameters that are not included in the slice header.

The syntax parser circuit 104 can store some of the slice header information in the internal memory 108 via the control circuit 106 and transmits the slice data following the slice header (i.e., data included in Video Coding Layer (VCL) NAL units) to the external video data processing apparatus/pipeline 140. The syntax parser circuit 104 also parses the bit stream to identify non-VCL NAL units which are transmitted to the control circuit 106. The non-VCL NAL units can be data that further indicates how associated slice data is to be processed by the video data processing apparatus/pipeline 140, such as Sequence Parameter Sets (SPS) and Picture Parameter Sets (PPS).

The control circuit 106 decodes the non-VCL NAL units using the Exp-Golomb decoder 109, and stores the results in the external memory 120. For example, non-VCL NAL unit including the PPS and SPS information can be decoded by the Exp-Golomb decoder 109 and stored in the external memory 120. Alternatively, in some embodiments according to the invention, an Exp-Golomb decoder included in the external video data processing apparatus/pipeline 140 may be used.

It will be understood that the SPS and PPS data can be applied to the processing of the respective slice data by referring to IDs that identifies which SPS/SPS are to be applied. Accordingly, the SPS and PPS information may be transmitted less frequently than the VCL NAL units that are processed to provide the video sequence as the same SPS and PPS information may be applied many times during the sequence. Transmitting the SPS and PPS information infrequently and applying the correct parameters by reference can provide increased data compression. The SPS and PPS information can include, for example, picture size, optional coding modes, and macroblock to slice group mapping. It will be further understood that the SPS and PPS information can be transmitted in-band or out-of-band relative to the VCL NAL units.

To reduce the likelihood of parsing errors, an emulation value (EB) included in NAL unit can avoid actual video data included in a NAL unit from being mis-interpreted as a start code. The syntax parser circuit 104 removes the EB data from the NAL unit.

Figure 2:
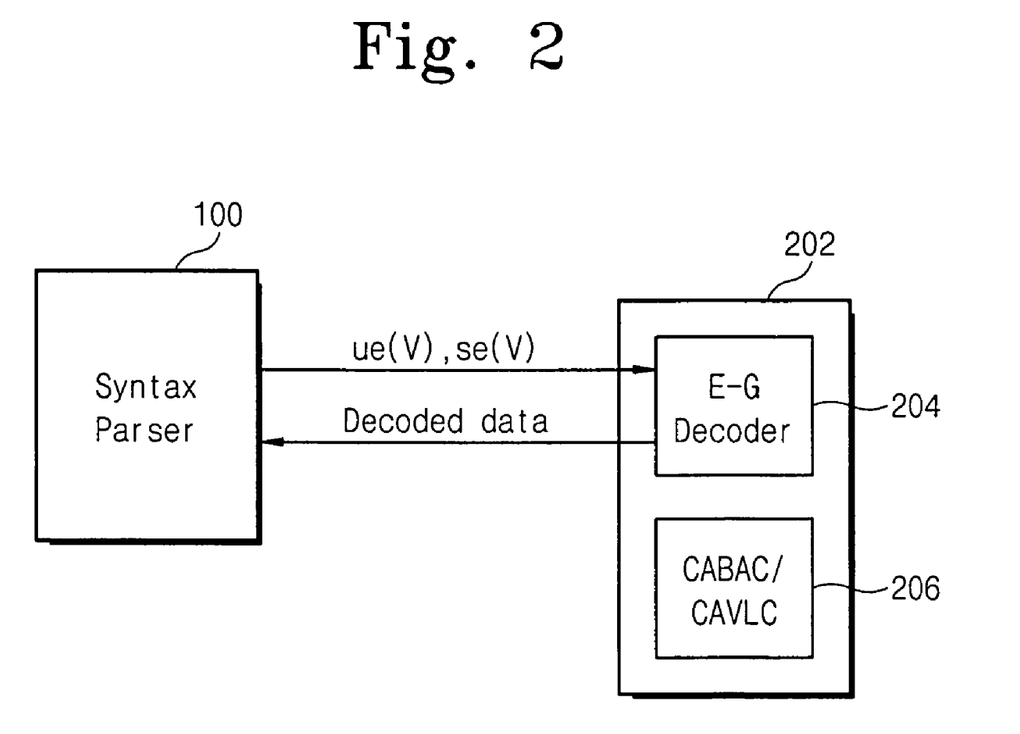
FIG. 2 is a block diagram that illustrates a syntax parser circuit coupled to an Exp-Golomb decoder circuit in an external entropy decoder circuit according to some embodiments of the invention.

FIG. 2 is a block diagram that illustrates a syntax parser 200 circuit coupled to an entropy decoder 202 in the external video data processing apparatus/pipeline 140 illustrated in FIG. 1. In particular, the external video data processing apparatus/pipeline 140 includes an Exp-Golomb decoder circuit 204 for decoding Exp-Golomb coded ue(V) and se(V) data. In some embodiments according to the invention, the external video data processing apparatus/pipeline 140 includes a context-based adaptive binary arithmetic coding circuit (CABAC) and/or a context adaptive variable length coding (CAVLC) circuit for processing video data.

As appreciated by the present inventors, H.264 compliant processors typically include various circuits, such as an entropy decoder, an inverse discrete cosine transformer, a predictor, and a de-blocking filter, in a pipeline arrangement, which are used to process slice data in a piecewise fashion using the respective slice header information stored the memory. The slice header for a slice may be maintained in the memory until the respective slice is processed by the various circuits. As further appreciated by the present inventors, if only one slice header were maintained in the memory, processing on the next the next slice may be delayed until processing for the present slice is complete. Delaying the processing in the above way may, therefore, increase the overall processing time for the frame (or sequence of frames).

Figure 3:
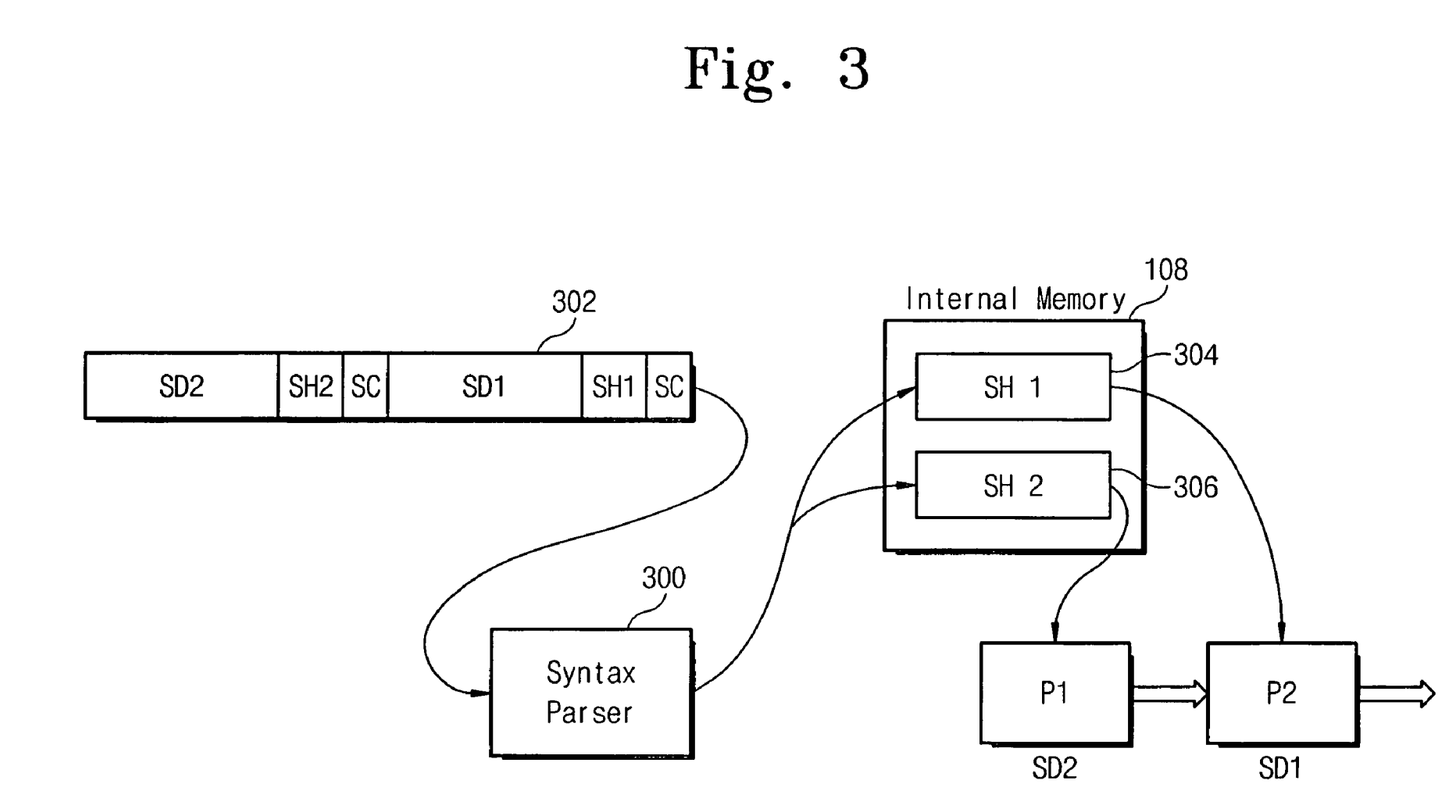
FIG. 3 is a diagram that illustrates operations of circuits, methods, and computer program products including an H.264 compliant a syntax parser according to some embodiments of the invention.

According to some embodiments of the invention, multiple regions of an internal memory can be allocated for concurrent storage of multiple slice headers for access during processing of the associated slices. The multiple regions of the internal memory can also concurrently store PPS and SPS information associated with the slice data corresponding to the slice header. For example, in some embodiments according to the invention as illustrated in FIG. 3, regions 304 and 306 of the internal memory 108 are allocated to concurrently store two slice headers: SH1 and SH2. SH1 and SH2 are slice headers that correspond to two slices of data: SD1 and SD2 respectively. The concurrently stored slice headers can be accessed for use in processing the respective slice data at different pipeline stages.

Referring to FIG. 3, the bit stream 302 (including slice data for a frame) is parsed by the syntax parser circuit 300 to detect the start code SC associated with SH1/SD1 according to the H.264 NAL unit format. The syntax parser circuit 300 applies an Exp-Golomb decoder to provide the slice header SH1 corresponding to the first slice data SD1, which is stored in the first storage region 304 of the internal memory 108. The syntax parser circuit 300 also provides the first slice data SD1 to a processing module P1 in the video data processing apparatus, such as the entropy decoder. Furthermore, when the slice data SD1 is shifted from the stage P1 to a later stage of the pipeline P2, SH1 is also shifted to apply to the respective later stage (i.e., P2).

The syntax parser circuit 300 further parses the bit stream 302 to detect the start code SC associate with SH2/SD2. SH2 is decoded using the Exp-Golomb decoder and stored in the second storage region 306 of the internal memory 108. The syntax parser circuit 300 provides the second slice data SD2 to the entropy decoder P1, and the first slice data SD1 is shifted to P2. The slice data SD1 is processed by P2 using SH1 stored in the first region 304 of the internal memory 108, whereas the second slice data SD2 is processed by P1 using SH2 stored in the second region 306 of the internal memory 108.

As described above, in some embodiments according to the invention, multiple regions of the internal memory are allocated for storage of multiple slice headers corresponding to respective slice data. The multiple slice headers are used in processing the respective slice data as the slice data progresses through the decoder pipeline. In some embodiments according to the invention, the slice header information is shifted with the respective slice data in the decoding pipeline. Therefore, it may be possible to reduce latency between processing of frames as the time delay between processing of slice data can be reduced.

Figure 4:
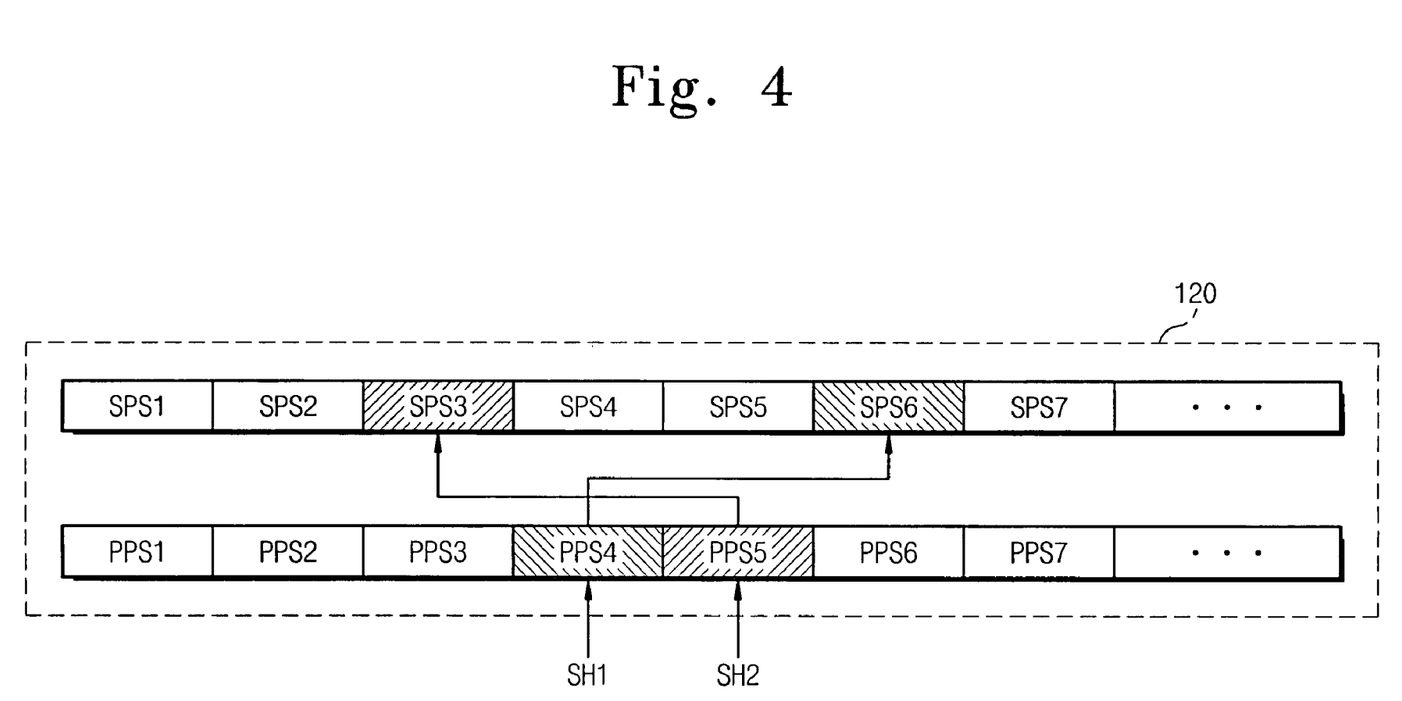
FIG. 4 is a diagram that illustrates relationships between SPS and PPS information in an H.264 compliant decoder circuit according to some embodiments of the invention.

For example, in some embodiments according to the invention, as illustrated in FIG. 4, a plurality of PPSs and SPSs (collectively referred to here as parameter sets), are parsed, decoded and stored in the external memory 120. In a subsequent transfer, a slice header is parsed and stored in the internal memory 108, including a PPS ID that identifies the PPS stored in the external memory 120 that is to be used in processing the slice data. Moreover, the PPS identified by the PPS ID includes an SPS ID that identifies the SPS to be used when processing the slice along with the PPS.

Referring still to FIG. 4, SH 1 includes a PPS ID of PPS 4 that indicates that the parameters included in PPS4 are to be applied when processing slice data associated with SH 1. Furthermore, one of the parameters included in PPS 4 is an SPS ID of SPS6 that indicates that SPS6 is also to be applied to the processing of slice data associated with SH 1. Similarly, SH 2 includes a PPS ID of PPS 5 that indicates that the parameters included in PPS 5 are to be applied when processing slice data associated with SH 2. Furthermore, one of the parameters included in PPS 5 is an SPS ID of SPS 3 that indicates that SPS 3 is also to be applied to the processing of slice data associated with SH 2.

It will be understood that, in some embodiments according to the invention, the PPS parameter set identified in the slice header and the SPS in the PPS (and in the corresponding PPS) can be moved from the external memory 120 to the internal memory 108 as the syntax parser circuit parses/decodes the slice header information. For example, according to FIG. 4, when the PPS ID in the SH 2 indicates PPS 5 is to be used, the parameters included in PPS 5 stored in the external memory 120 are transferred to the internal memory 108. Further, when the SPS ID included in PPS 5 equals SPS 3, the parameters included in SPS 3 are transferred from the external memory 120 to the internal memory 108.

In operations illustrated by FIGS. 2, 3 and 4, in some embodiments according to the invention, the syntax parser circuit 104 decodes the PPS and SPS information using the Exp-Golomb decoder 109, and stores the PPS and SPS information in the external memory 120. When slice data SD 1 is provided to P1, the parameters from PPS 4 and SPS 6 are also provided to P1 to control the processing of SD 1 by P1. Output from P1 based on the processing of SD 1 is provided to P2 along with the parameters from PPS 4 and SPS 6. Concurrently, SD 2 is provided to P1, and parameters from PPS 5 and SPS 3 are provided to P1 to control the processing of SD 2 by P1. Output from P1 based on the processing of SD 2 is provided to P2 along with the parameters from PPS 5 and SPS 3. In other words, the PPS and SPS parameters are shifted to control processing of the respective slice data at subsequent stages of the pipeline.

Figure 5:
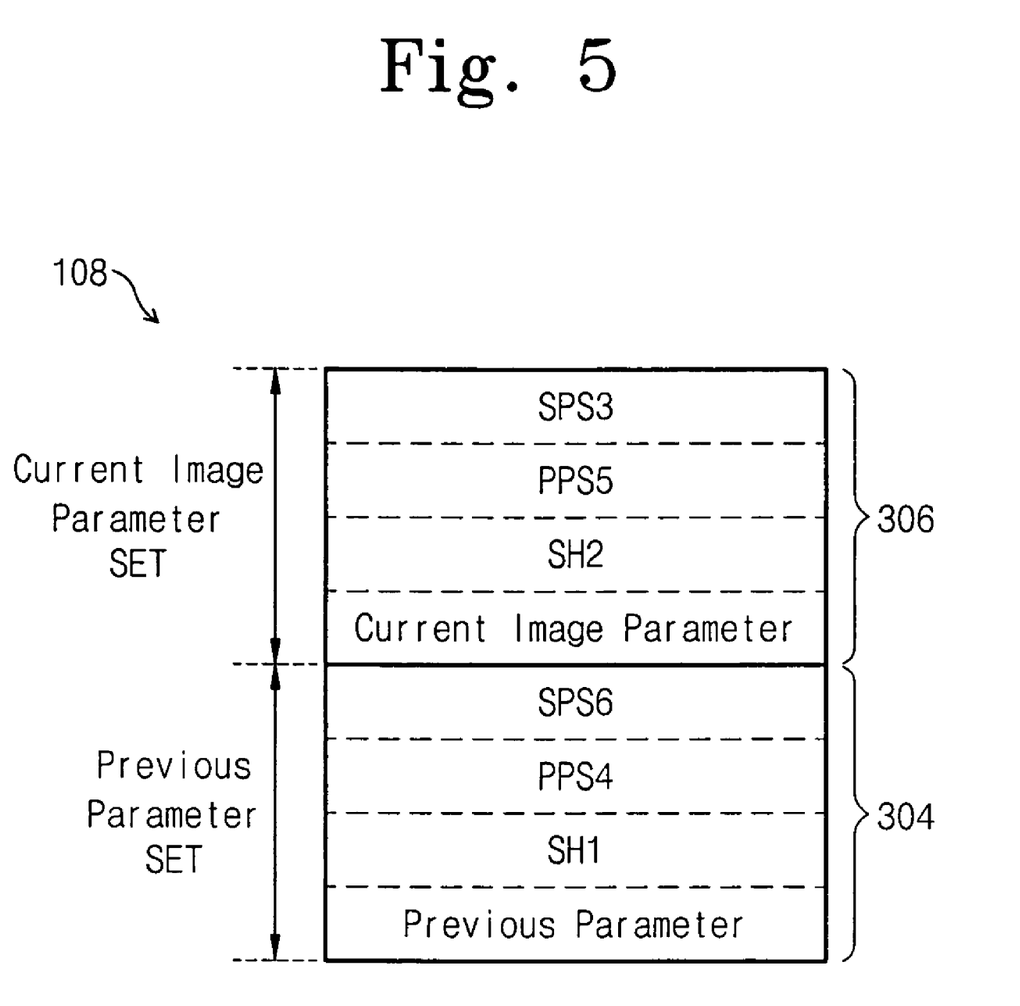
FIG. 5 is a diagram that illustrates parameters in some embodiments according to the invention stored in the respective regions of a memory.

FIG. 5 is a diagram that illustrates parameter sets in some embodiments according to the invention stored in the respective regions of a memory. Referring to FIGS. 4 and 5, a previous parameter set, such as slice header SH 1, a PPS (PPS 4) and SPS (SPS 6) associated with the previous slice and parameters for processing the previous slice data are stored in the first storage region 304 of the internal memory 108. A current parameter set, such as slice header SH 2, a PPS (PPS 5) and SPS (SPS 3) associated with the current slice and parameters for processing the current image are stored in the second storage region 306 of the internal memory 108. In some embodiments according to the invention, when a stage of the processing pipeline (P1) completes processing of the previous slice (SH 1), the parameter set of the current slice (SH 2) is transferred to the first storage region 304. In some embodiments according to the invention, pointers are used for each stage of the processing pipeline. The pointers can point to the parameters to be used for processing in that stage for the next time interval so that when a stage of the processing pipeline (P1) completes processing of the previous slice (SH1), the pointer changes so that the parameters associated with the current slice are used for that stage of the processing pipeline.

As described above, in some embodiments according to the invention, multiple regions of the internal memory are allocated for storage of multiple slice headers corresponding to respective slice data. The multiple slice headers are used in processing the respective slice data as the slice data progresses through the decoder pipeline. In some embodiments according to the invention, the slice header information is shifted with the respective slice data in the decoding pipeline. Therefore, it may be possible to reduce latency between processing of frames as the time delay between processing of slice data can be reduced.

As described above, the present invention was described in detail with reference to embodiments of the H.264 syntax parser. However, it will be understood by those skilled in the art that various changes in form and details may be made without departing from the spirit and scope of the invention as defined by the appended claims.

What is claimed is:

1. A method of processing H.264 compliant data comprising:
    allocating a plurality of regions in a memory internal to an H.264 compliant syntax parser circuit for concurrent storage of a plurality of slice headers associated with respective H.264 slice data to be processed, the method further comprising:
    transferring a plurality of parameter sets associated with the plurality of slice headers from an external memory to the internal memory;
    wherein transferring comprises:
        transferring a plurality of first parameter sets to a first allocated region of the internal memory responsive to parsing a first slice header that references the first parameter set;
        transferring a plurality of second parameter sets to a second allocated region of the internal memory responsive to parsing a second slice header that references the second parameter set;
    wherein the plurality of first parameter sets includes a first H.264 compliant Picture Parameter Set (PPS) and a first H.264 compliant Sequence Parameter Set (SPS) and the plurality of second parameter sets comprises a second H.264 compliant PPS and a second H.264 compliant SPS;
    applying the first PPS and the first SPS to a first stage of a video processing pipeline to provide processing of a first slice associated with a first one of the plurality of slice headers;
    wherein the first stage provides an output based on the processing of the first slice, the method further comprising:
    applying the second PPS and the second SPS to the first stage to provide processing of a second slice associated with a second one of the plurality of slice headers; and
    concurrently applying the first PPS and the first SPS to a second stage of the video processing pipeline to provide processing of the output from the first stage.

2. A method according to claim 1 further comprising:
    transferring the first PPS and the first SPS to the second region of the internal memory prior to concurrently applying the first PPS and the first SPS to the second stage.

3. A method according to claim 1 further comprising:
    changing a pointer associated with the second stage of the video processing pipeline to the first region prior to concurrently applying the first PPS and the first SPS to the second stage.

4. An H.264 compliant processing circuit comprising:
    a syntax parser circuit configured to parse an H.264 compliant bit stream to detect H.264 slice headers and non-Video Coding Layer (VCL) Network Abstraction Layer (NAL) units;
    a memory, coupled to the syntax parser circuit, configured for allocation of a plurality of regions therein for concurrent storage of the H.264 slice headers; and
    a control circuit, coupled to the syntax parser circuit and the memory, configured to transfer a plurality of first parameter sets to a first one of the allocated plurality of regions responsive to receiving a parsed first slice header that references the first parameter set and configured to transfer a plurality of second parameter sets to a second one of the allocated plurality of regions of the internal memory responsive to parsing a second slice header that references the second parameter set;
    wherein the circuit is further configured to apply the first PPS and the first SPS to a first stage of a video processing pipeline to process a first slice associated with a first one of the plurality of slice headers;
    wherein the first stage provides an output based on the processing of the first slice, wherein the circuit is further configured to apply the second PPS and the second SPS to the first stage to process a second slice associated with a second one of the plurality of slice headers and configured to concurrently apply the first PPS and the first SPS to a second stage of the video processing pipeline to process the output from the first stage.

5. A circuit according to claim 4 wherein the memory comprises an internal memory included in an integrated circuit package with the syntax parser circuit.

6. A circuit according to claim 4 wherein the plurality of first parameter sets includes a first H.264 compliant Picture Parameter Set (PPS) and a first H.264 compliant Sequence Parameter Set (SPS) and the plurality of second parameter sets comprises a second H.264 compliant PPS and a second H.264 compliant SPS.

7. A circuit according to claim 4 wherein the control circuit is further configured to transfer the first PPS and the first SPS to the second region of the internal memory prior to concurrently applying the first PPS and the first SPS to the second stage.

8. A circuit according to claim 4 wherein the control circuit is further configured to change a pointer associated with the second stage of the video processing pipeline to the first region prior to concurrently applying the first PPS and the first SPS to the second stage.

9. A computer program product for processing H.264 compliant data comprising a computer readable medium having computer readable program code embodied therein, the computer readable program product comprising:
   computer readable program code configured to allocate a plurality of regions in a memory internal to an H.264 compliant syntax parser circuit for concurrent storage of a plurality of slice headers associated with respective H.264 slice data to be processed;
   computer readable program code configured to transfer a plurality of parameter sets associated with the plurality of slice headers from an external memory to the internal memory;
   wherein the program code configured to transfer comprises:
   computer readable program code configured to transfer a plurality of first parameter sets to a first allocated region of the internal memory responsive to parsing a first slice header that references the first parameter set;
   computer readable program code configured to transfer a plurality of second parameter sets to a second allocated region of the internal memory responsive to parsing a second slice header that references the second parameter set;
   wherein the pluralit of first parameter sets includes a first H.264 compliant Picture Parameter Set (PPS) and a first H.264 compliant Sequence Parameter Set (SPS) and the plurality of second parameter sets comprises a second H.264 compliant PPS and a second H.264 compliant SPS;
   computer readable program code configured to apply the first PPS and the first SPS to a first stage of a video processing pipeline to provide processing of a first slice associated with a first one of the plurality of slice headers;
   wherein the first stage provides an output based on the processing of the first slice, the computer readable program code further comprising:
   computer readable program code configured to apply the second PPS and the second SPS to the first stage to provide processing of a second slice associated with a second one of the plurality of slice headers; and
   computer readable program code configured to concurrently apply the first PPS and the first SPS to a second stage of the video processing pipeline to provide processing of the output from the first stage.

10. A computer program product according to claim 9 further comprising:
    computer readable program code configured to transfer the first PPS and the first SPS to the second region of the internal memory prior to concurrently applying the first PPS and the first SPS to the second stage.

11. A computer program product according to claim 9 further comprising:
    computer readable program code configured to change a pointer associated with the second stage of the video processing pipeline to the first region prior to concurrently applying the first PPS and the first SPS to the second stage.

* * * * *